United States Patent

[11] 3,623,595

[72] Inventors  Richard T. Brown
               Route 4, Box 251;
               Burnice H. Brown, Route 4; Harold D.
               Brown, Route 4, Box 311, all of Darlington,
               S.C. 29532
[21] Appl. No. 886,112
[22] Filed      Dec. 18, 1969
[45] Patented   Nov. 30, 1971

[54] TOBACCO LEAF ORIENTING MACHINE
     14 Claims, 7 Drawing Figs.
[52] U.S. Cl. .................................................. 198/33 R
[51] Int. Cl. .................................................. B65g 47/24
[50] Field of Search ........................................ 193/43;
                                              198/33 R; 131/149

[56]              References Cited
                UNITED STATES PATENTS
2,618,373  11/1952  Hathaway .................... 193/33 R
2,796,202  6/1957   Lawrence et al. ............. 222/233
3,439,793  4/1969   Rakestraw .................... 193/43 X Primary Examiner—Evon C. Blunk
Assistant Examiner—H. S. Lane
Attorneys—Munson H. Lane and Munson H. Lane, Jr.

ABSTRACT: A vertically elongated chamber has a current of air blowing upwardly therethrough so that leaves deposited into the chamber are subjected to a combined effect of gravity and airflow and heavy stems of the leaves are thus oriented downwardly; conveyor means in the chamber translate the leaves laterally so that the leaves move, stem first, through an outlet passage at one side of the lower portion of the chamber. The leaves then fall onto a discharge conveyor with their stems oriented in the same direction. A zone of reduced pressure at the upper end of the chamber prevents the leaves being blown out the top of the chamber. Kicker means within the chamber above the conveyor means aid in separating leaves which may be stuck together.

PATENTED NOV 30 1971

INVENTORS
RICHARD T. BROWN
BURNICE H. BROWN &
HAROLD D. BROWN

BY Munson H. Kane

ATTORNEY

INVENTORS
RICHARD T. BROWN
BURNICE H. BROWN &
HAROLD D. BROWN

BY Munson H. Lane
ATTORNEYS

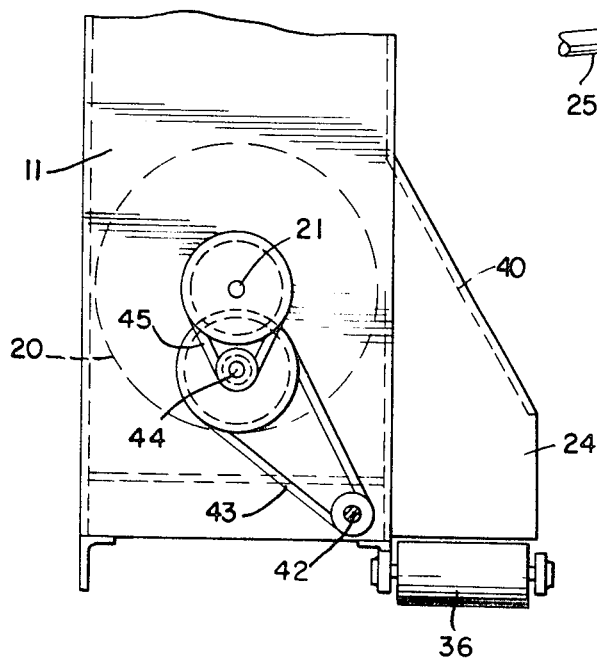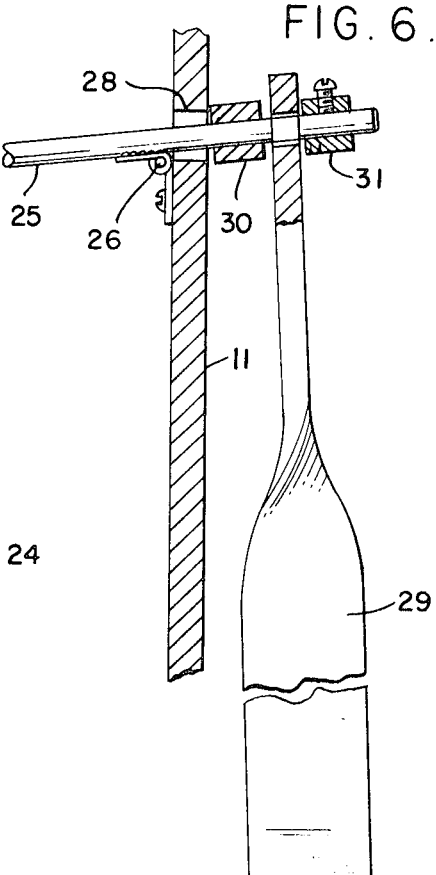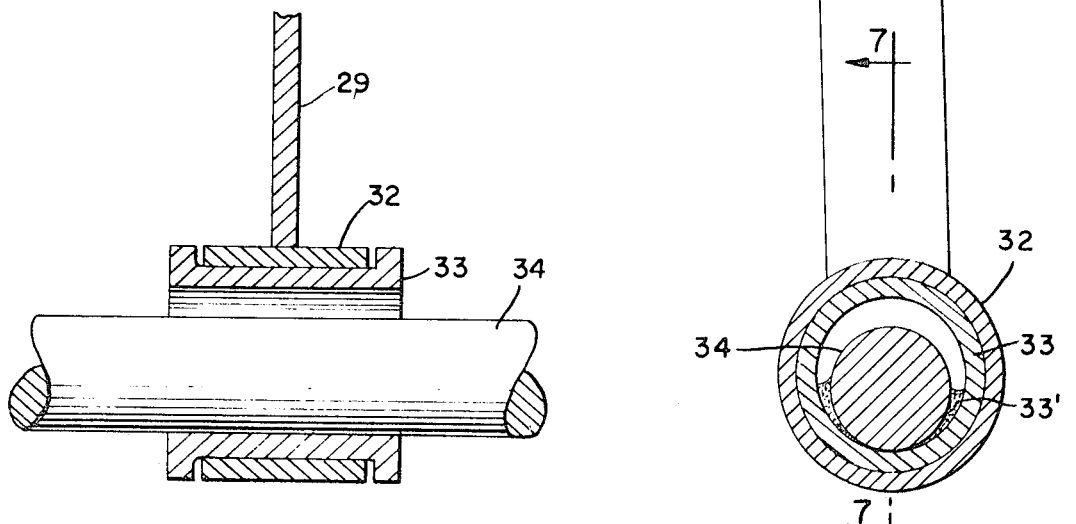

TOBACCO LEAF ORIENTING MACHINE

This invention relates to new and useful improvements in machines for orienting tobacco leaves after they have been harvested and are disposed at random, the principal object of the invention being to arrange the leaves so that their stems are oriented in the same direction, thus enabling the leaves to be tied in bundles or otherwise further processed.

The machine of the invention is simple in construction, efficient and dependable in operation, and may be associated with a conventional tobacco leaf harvester. Alternatively, the machine may be a separate entity, either stationary or portably mounted.

It is an object of the invention to provide a tobacco leaf orienting machine comprising a vertically disposed ductlike housing defining a vertically elongated chamber having a leaf inlet at its upper end and a leaf outlet at one side of its lower end portion, a blower for producing a current of air upwardly through the chamber so that leaves deposited into the chamber through the inlet are subjected to the combined effect of gravity and upward airflow and are thereby oriented with their relatively heavy stems pointing downwardly, an endless leaf carrier provided in the lower end portion of said chamber and movable in the direction of the leaf outlet, the endless leaf carrier being foraminous to permit the upward flow of air therethrough.

It is a further object of the invention to provide an outwardly flared open top portion for the ductlike housing of the invention to provide a reduced pressure zone within the elongated chamber.

It is a further object of the invention to provide a downwardly inclined partition within said outwardly flared open top which divides the open top into a narrow leaf inlet passage and a wide air exhaust passage.

It is a further object of the invention to provide a foraminous screen over the air exhaust passage through the outwardly flared open top.

It is another object of the invention to provide blower means at the bottom of the vertically disposed housing to push air upwardly through the housing.

It is a further object of the invention to provide leaf-translating means in the housing of the invention above the endless carrier, to engage the downwardly moving leaves and move them upwardly and toward one side of the housing. The translating means preferably includes a set of pivotally mounted fingers extending transversely across the elongated chamber and means for causing alternate fingers to oscillate from a downwardly inclined position to a horizontal position and vice versa 180° out of phase with the oscillatory movement of the other fingers of the set. The translating means is effective to separate leaves which may be stuck together and to move the leaves toward one side of the chamber.

It is a further object of the invention to provide a leaf outlet chute offset from one side of the lower end portion of the ductlike housing, the outlet chute having a foraminous wall downwardly inclined from the ductlike housing through which air may pass.

It is a further object of the invention to provide a discharge conveyor at the bottom of the outlet chute.

With the foregoing more important objects and features in view and such other objects and features which may become apparent as this specification proceeds, the invention will be understood from the following description taken in conjunction with the accompanying drawings, wherein like characters of reference are used to designate like parts, and wherein:

FIG. 5 is a fragmentary end elevational view of the drive mechanism;

FIG. 6 is an enlarged view, partly in elevation and partly in section along the line 6—6 in FIG. 4; and FIG. 7 is a sectional detail, taken in the plane of the line 7—7 in FIG. 6.

Figures 1, 2:
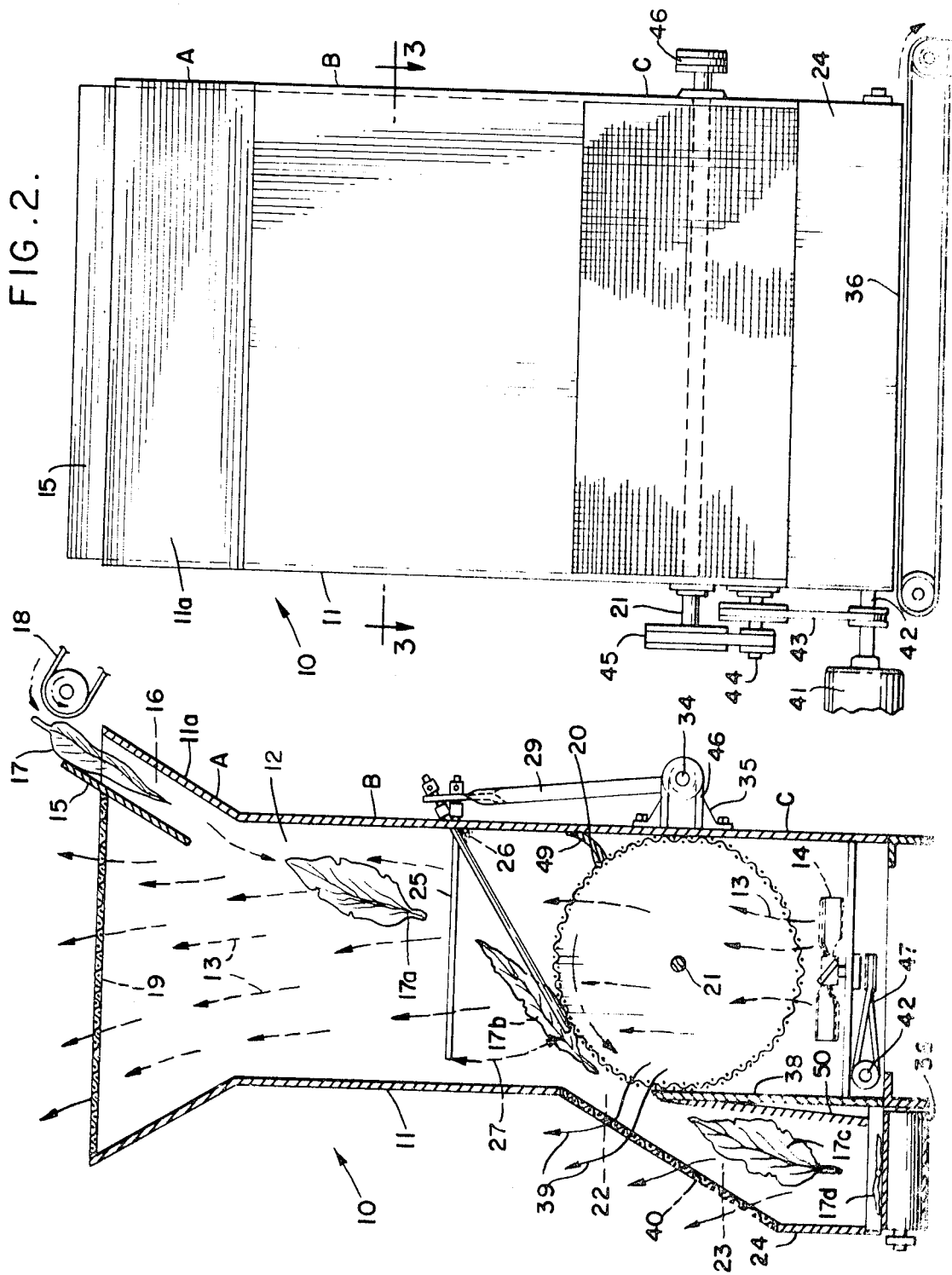
FIG. 1 is a vertical sectional view taken on line 1—1 of FIG. 3 of a machine in accordance with the invention.
FIG. 2 is a side elevational view thereof.

Referring now to the accompanying drawings in detail, the tobacco leaf orienting machine of the invention is designated generally by the reference numeral 10, the same comprising a vertically elongated housing 11 which defines a vertically elongated chamber 12. The chamber 12 is open at the bottom of the housing to facilitate ingress of air, and the upper end of the chamber is also open for the outlet of air, the airflow upwardly through the chamber as indicated by the arrows 13 being produced by one or more blowers or fans 14 mounted in the lower end portion of the housing.

For purpose of describing the function of the various portions of the machine the housing may be described as having an upper end portion A, an intermediate portion B and a lower end portion C, as indicated in FIG. 2.

The sidewall portions at the upper end of the housing 11 are outwardly flared as at 11a, and a partition 15 is provided in the open upper end of the housing in closely adjacent relation to one of the flared wall portions 11a. The space between that wall portion and the partition defines an inlet passage 16 through which tobacco leaves may be deposited into the chamber 12, as indicated at 17, as for example by a suitable supply conveyor 18. The conveyor 18 discharges the leaves into the inlet passage 16 while the leaves are disposed at random on the conveyor, but as the leaves enter the chamber 12 through the passage 16, they are subjected to a combined effect of gravity and upward airflow, which causes their relatively heavy steams to be oriented downwardly, as indicated at 17a. The open upper end of the chamber 12 is preferably covered by a screen 19 to safeguard against any possibility of the leaves being blow outwardly therethrough, although it will be understood that the force of the current of air through the chamber is normally only sufficient to promote the leaf-orienting action in conjunction with gravity as already described, so that the leaves gravitate in the chamber rather than having a tendency to be blown upwardly. In relation to the air outlet at the top of the chamber, the leaf inlet passage 16 is of a small cross section and this, coupled with the fact that the passage 16 is slanted in parallel to the wall portion 11a, precludes any possibility of leaves being blown upwardly from the passage 16 after they are dropped thereinto by the conveyor 18.

Further the outwardly flared upper end portion A of the housing 11 provides a zone of reduced pressure at the upper end of the chamber 12 whereby the upward flow of air has less effect on the tobacco leaves in the upper end of the chamber 12 than in the midsection B of the chamber where the walls of housing 11 are vertical. Thus, tobacco leaves which may be forced up into the upper end A of the chamber 12 by the upward flow of air therein, are able to drop back into the midportion B of the chamber 12. The leaf as it falls back orients itself with the heavier stem pointing downwardly and the flat leaf portion extending vertically upwardly therefrom.

A foraminous endless leaf carrier 20 is provided in the lower end portion of the chamber 12 above the blowers 14 so that the current of air from the blowers passes through the carrier and upwardly through the chamber. As shown, the endless carrier 20 is in the form of a screen drum carried by a horizontal shaft 21 journaled in the housing 11. However, if preferred, the carrier may be in the form of an endless screen conveyor or a slat conveyor passing around a pair of rollers, but in any event the carrier is driven in such direction that leaves falling on top of the carrier are delivered through an outlet opening 22 in one sidewall of the housing 11, into an outlet passage 23 which is defined by an extension 24 on that sidewall of the lower portion of the housing.

A set of transversely spaced kicker arms 25 are provided in the chamber 12 above the carrier 20 for the purpose of engaging the falling leaves 17a to aid in separating leaves which may be stuck together by translating them upwardly and laterally as at 17b so that they fall onto the carrier 20 with their stems oriented in the direction of the outlet opening 22. The kicker arms or members 25 may be in the form of rods which are hinged in the housing 11 as shown at 26 in FIG. 6, the hinge axis being transverse to the direction of movement of the carrier 20, or in other words, parallel to the shaft 21, and permitting the kicker arms 25 to oscillate in vertical planes, between a substantially horizontal raised position and downwardly slanted lowered position, as indicated by the arrow 27 in FIG. 1.

The kicker arms 25 project outwardly through openings 28 in the housing 11 (see FIG. 6) and their outer end portions are connected to actuating links 29, there being one such link for each of the kicker arms and having an apertured upper end loosely positioned on the projecting end portion of the kicker arm between a pair of retaining collars 30, 31, as will be apparent.

Figure 3:
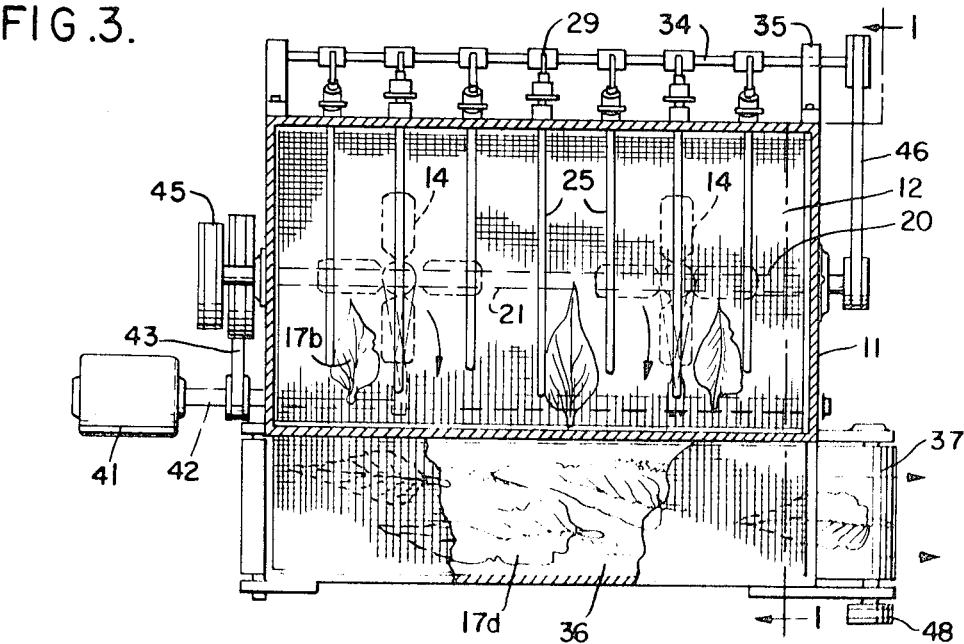
FIG. 3 is a horizontal sectional view, taken substantially in the plane of the line 3—3 of FIG. 2.
Figure 4:
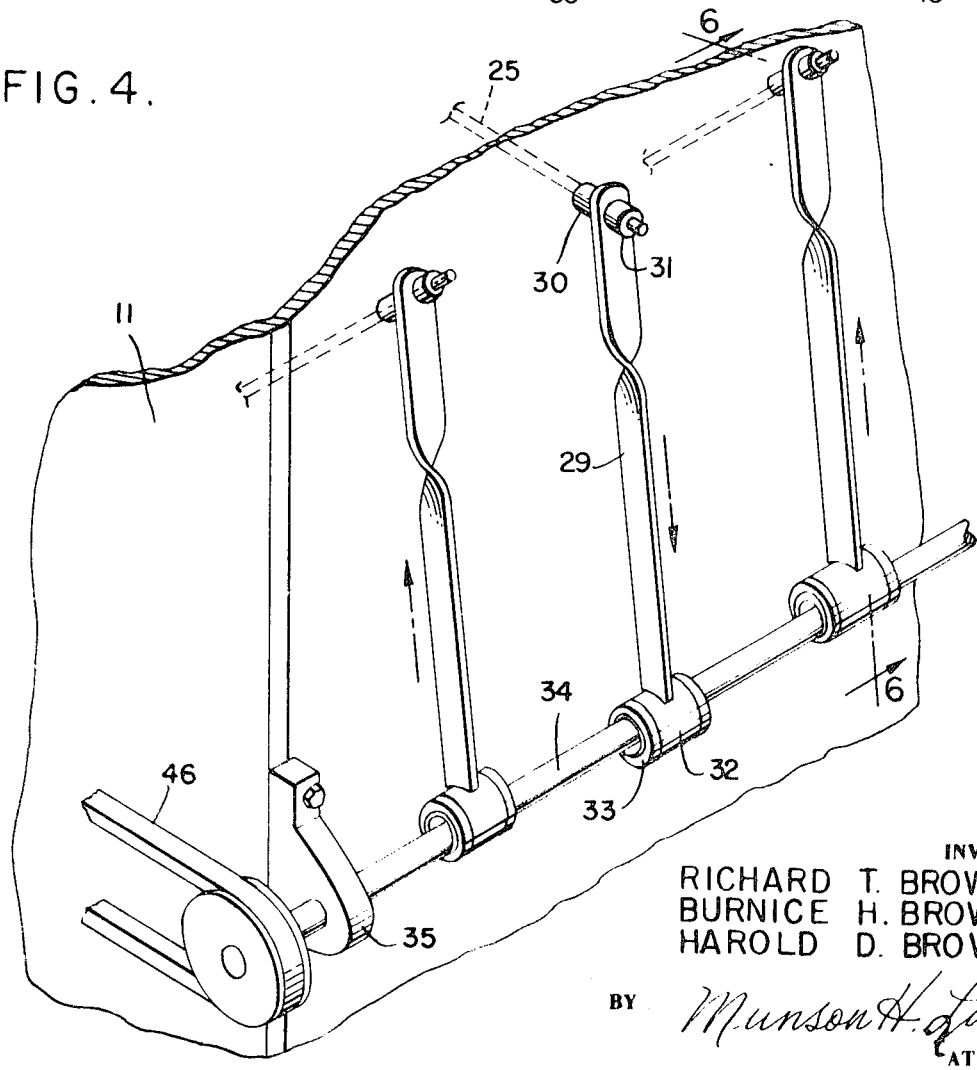
FIG. 4 is an enlarged, fragmentary perspective view showing the actuating means for the kicker arms.

The lower end of each link 29 is provided with a tubular member 32 which rotatably encircles an eccentric 33 secured to a shaft 34 which is journaled in bearings 35 on the outside of the housing 11, the several eccentrics 33 on the shaft 34 being out of phase so that while alternate kicker arms 25 are moving downwardly, those between them are moving upwardly, and vice versa. As already noted, the oscillating movement of the kicker arms serves to translate the stem-down oriented leaves 17a upwardly and laterally as at 17b, so that they drop into engagement with the carrier 20 with their stems oriented in the direction of the outlet opening 22 and are discharged by the carrier through that opening into the outlet passage 23, where the leaves again assume the stem-down orientation and ultimately fall upon a discharge conveyor 36. This conveyor is provided under the housing extension 24 and moves in the direction of the arrow 37 as shown in FIG. 3, and when the downwardly oriented stems of the leaves 17o in the outlet passage 23 come into contact with the conveyor, the leaves fall flat on the conveyor as at 17d, with their stems oriented in the same direction, that is, the direction of travel of the conveyor, as at 37.

The stem-down orientation of the leaves 17c in the outlet passage 23 is further assisted, as in the main chamber 12, by the combined effect of gravity and upward airflow, and for this purpose the offset housing extension 24 is provided with a sloping screened portion 40 which permits a portion of the air delivered by the blowers 14 to flow laterally and upwardly through the opening 22 and to be discharged outwardly from the passage 23 through the screen 40 as indicated at 39. The outward flow of air through screen 40 also induces a slight flow of air upwardly through the bottom of the housing extension 24.

A suitable drive motor 41 rotates a drive shaft 42 which is journaled in the lower end portion of the housing 11 and is connected by a belt drive 43 to a countershaft 44, which in turn drives the shaft 21 and the associated carrier 20 through a belt drive 45. At the opposite end of the machine the shaft 21 is connected by a belt drive 46 to the shaft 34, thus actuating the links 29 and the kicker arms 25. Moreover, the drive shaft 42 is connected by belt drives 47 to the blowers 14 (see FIG. 1) and the motor 41 thus drives all the moving components of the machine with exception of the leaf supply conveyor 18 and the delivery conveyor 36, which conveyors may be driven separately, as for example at 48.

A baffle 49 is provided adjacent the housing wall opposite opening 22 and over the endless carrier 20 to deflect leaves onto the surface of the carrier and guard against the leaves being caught between the carrier and the housing wall with ensuing possible damage to the leaves. Also a downwardly inclined baffle 50 is provided adjacent the common inner wall 38 separating the housing 12 and its offset housing extension 24 to overlay the discharge conveyor 36 and guard against leaves falling between the conveyor 36 and the wall 38.

What is claimed is:

1. A tobacco leaf orienting machine, comprising in combination a vertically elongated chamber having a leaf inlet at its upper end and a leaf outlet at one side of its lower end portion, means for producing a current of air upwardly through said chamber so that leaves deposited into the chamber through said inlet are subjected to a combined effect of gravity and upward airflow and are thereby oriented with their relatively heavy stems pointing downwardly, an endless leaf carrier provided in the lower end portion of said chamber and movable in the direction of said leaf outlet, and leaf-translating means provided in said chamber above said carrier, said translating means being operative to laterally deflect the stem-down oriented leaves so that they come to engage said carrier with their stems pointed in the direction of said leaf outlet, said endless carrier being foraminous and having said current of air passing upwardly therethrough.

2. The machine as set forth in claim 1 wherein said chamber is constituted by a housing which also includes a lateral extension defining an outlet passage in communication with said leaf outlet of the chamber, and an oriented-leaf delivery conveyor provided at the bottom of said outlet passage.

3. The machine as set forth in claim 2 wherein said air current producing means includes a blower at the lower end of said chamber forcing air upwardly through the chamber and also laterally into said outlet passage, said lateral housing extension having a foraminous wall for dispersion of forced air outwardly from said passage.

4. The machine as set forth in claim 1 wherein said air current producing means includes a blower at the lower end of said chamber below said endless carrier, said blower forcing air upwardly through the foraminous carrier and through said chamber.

5. The machine as set forth in claim 1 wherein said leaf-translating means comprise a set of transversely spaced oscillatory kicker members provided in said chamber above said carrier.

6. The machine as set forth in claim 5 which is further characterized in that said kicker members are oscillated in vertical planes about a horizontal axis transverse to the direction of movement of said carrier.

7. The machine as set forth in claim 6 which is further characterized in that said kicker members are oscillated between a substantially horizontal position and a downwardly slanted position.

8. The machine as set forth in claim 1 wherein said chamber is constituted by a housing having an open upper end, together with a partition provided in the upper end portion of said housing in closely adjacent relation to one side thereof, said leaf inlet existing between said one side of the housing and said partition.

9. The machine as defined in claim 8 which is further characterized in that said one side of the upper end portion of said housing is outwardly flared, said partition being disposed in closely spaced parallel relation to said flared side of the housing.

10. A tobacco leaf orienting machine comprising in combination a vertically elongated housing having an open upper end portion, a lower end portion and an intermediate portion between said upper and lower end portions, said housing defining a vertically elongated chamber, a leaf inlet in the upper end portion of said housing, and a leaf outlet at one side of the housing in the lower end portion thereof, blower means in said bottom end portion for forcing a current of air upwardly through said chamber so the leaves deposited into said chamber through said inlet are subjected to a combined effect of gravity and upward airflow and are thereby oriented with their relatively heavy stems pointed downwardly, and conveyor means within said chamber above said blower means for moving tobacco leaves transversely of said chamber in the direction of said outlet means, said conveyor means comprising a foraminous endless carrier through which said air current will pass.

11. The machine as set forth in claim 10 wherein said upper end portion has sidewalls flaring outwardly and upwardly from the top of said intermediate portion, defining a zone or reduced air pressure in relation to the air pressure in said intermediate portion, and a slanted partition extending across said upper end portion and separating the open end thereof into said leaf inlet and into an air exhaust passage, said zone of reduced pressure being effective to prevent any leaves which are forced into said zone by upward airflow from passing out of said chamber through said open upper end portion and permitting the leaves to fall back downwardly through said chamber.

12. The machine set forth in claim 11 wherein said air exhaust passage is covered with a foraminous screen.

13. The machine set forth in claim 10 wherein said endless carrier is a foraminous cylindrical drum, mounted horizontally within the lower end portion of said housing with means for rotating the drum so that the upper surface of the drum rotates in the direction of said leaf outlet.

14. A tobacco leaf orienting machine comprising in combination a vertically elongated housing having an open upper end portion, a lower end portion and an intermediate portion between said upper and lower end portions, said housing defining a vertically elongated chamber, a leaf inlet in the upper end portion of said housing, and a leaf outlet at one side of the housing in the lower end portion thereof, blower means in said bottom end portion for forcing a current of air upwardly through said chamber so the leaves deposited into said chamber through said inlet are subjected to a combined effect of gravity and upward airflow and are thereby oriented with their relatively heavy stems pointed downwardly and conveyor means within said chamber above said blower means for moving tobacco leaves transversely of said chamber in the direction of said outlet means, together with thrust means mounted in said intermediate portion above said conveyor means for striking downwardly falling leaves and giving them an upward and sidewise thrust, said thrust means comprising a set of multiple horizontally spaced kicker members pivotally mounted on one side of said housing on a substantially horizontal axis and extending inwardly substantially across said chamber, and means for oscillating said kicker members between a substantially horizontal position and a downwardly inclined position, with alternate kicker members oscillating 180° out of phase with the other members of said set.

* * * * *